United States Patent Office 3,249,627
Patented May 3, 1966

3,249,627
METHOD FOR PREPARING 2α - METHYL - 3 - ON-AZINES OF 3-KETO STEROIDS OF THE ANDROSTANE AND OESTRANE SERIES
Pietro de Ruggieri, Milan, Italy, assignor to Ormonoterapia Richter S.p.A., Milan, Italy
No Drawing. Filed Nov. 5, 1963, Ser. No. 321,447
Claims priority, application Italy, Apr. 3, 1963, 6,784/63
7 Claims. (Cl. 260—397.4)

This invention relates to a method for the preparation of new steroids, having a high anabolic activity and free from collateral effects of the androgenic, progestinic, cortical and antihypophyseal type, of the formula:

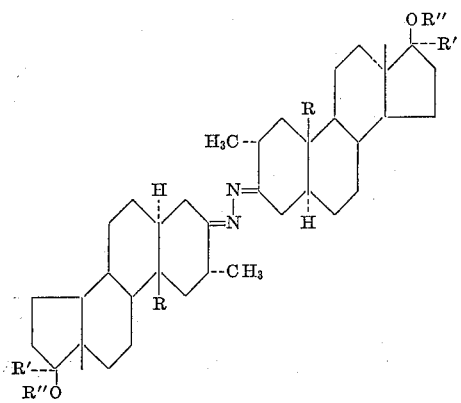

wherein R and R' are members selected from the group consisting of H and CH₃, and R" is a member selected from the group consisting of H and radicals of aliphatic acids of 2 to 10 carbon atoms.

These steroids are prepared by using as starting materials the compounds of the formula:

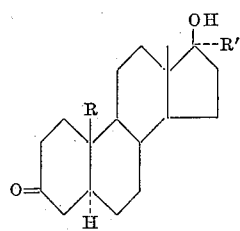

wherein R and R' are members selected from the group consisting of H and CH₃, which are reacted with ethyl formate and sodium methylate, sodium hydride, or sodium amide, in a solvent selected from the group consisting of tetrahydrofuran, dioxane, dimethylsulfoxide, dimethylformamide, and dimethylacetamide, to obtain 2-hydroxymethylene-3-keto-steroids.

The use of such highly polar solvents has been found essential for a successful synthesis. They make possible shorter reaction times, and the employment of markedly lower amounts of the solvents and reactants as compared to the method of the prior art; moreover, they are advantageous in that they make soluble the sodium salt of the methylene group α to the 3-ketone, which is formed at the beginning of the reaction, and in that they are water miscible, thus giving the desired product by direct precipitation at the end of the reaction.

Moreover, certain of these solvents enable the reaction sequence to be carried out directly; in fact, when employing tetrahydrofuran and dioxane, the hydroxymethylene group is directly reduced to a methyl group upon addition of gaseous hydrogen chloride and hydrogenation in the presence of the palladium-on-carbon catalyst.

The hydrogen chloride addition has been found very important, since at atmospheric pressure it reduces the reaction time to about one-twentieth of that required when carrying out a reduction without any acid addition, and it gives a double yield of the 2α-methyl compound, which can then be crystallized directly.

This may be explained by the fact that the acid promotes the hydroxymethylene group hydrogenolysis and moreover, by carrying out a collateral attack, it brings the axial 2β-methyl epimer which is formed into the more stable equatorial 2α-methyl position.

The mixture is finally neutralized, the catalyst is filtered, some of the solvent is distilled off, and the reaction with hydrazine leading to the compounds of the invention may be directly carried out in the same solvent and reaction vessel. If the product is reacted with anhydrides or chlorides of an aliphatic acid of 2 to 10 carbon atoms prior to this latter step, and the reaction with hydrazine is then carried out, the 17β-esters of the compounds of the invention are obtained.

The following examples further illustrate the invention but are not limitative thereof.

EXAMPLE 1

2-formyl-17α-methyl-5α-androstan-17β-ol-3-one 18.36 parts of sodium methylate are added with stirring and under a nitrogen stream to a solution of 51.68 parts of 17α-methyl-androstanolone in 455 parts of freshly distilled, anhydrous dimethylacetamide, and 28.4 parts of ethyl formate are added 10 minutes later, while keeping the temperature at about 20° C. After 10 minutes the mixture is poured into water, acidified with 2 N sulfuric or hydrochloric acid, subjected to a centrifugation, washed neutral, and dried; 55 parts of 2-formyl-17α-methyl-5α-androstan-17β-ol-3-one, M.P. 176–179° C., are obtained; $[\alpha]_D = +34°$ (chloroform).

EXAMPLE 2

2-formyl-17α-methyl-5α-androstan-17β-ol-3-one 25.84 parts of 17α-methyl-androstanolone dissolved in 275 parts of dimethylformamide are reacted with stirring with 9.18 parts of sodium methylate and 14.2 parts of ethyl formate under a nitrogen stream, keeping the temperature at about 25° C. The mixture is poured into water 30 minutes after the end of the addition, acidified with 2 N sulfuric acid or hydrochloric acid, subjected to a centrifugation, and washed neutral. 27.8 parts of 2-formyl-17α-methyl-5α-androstan-17β-ol-3-one, M.P. 176–179° C., are obtained upon drying; $[\alpha]_D = +34°$ (chloroform).

EXAMPLE 3

2-formyl-5α-androstan-17β-ol-3-one 20.52 parts of sodium methylate are added to a suspension of 55 parts of 5α-androstan-17β-ol-3-one in 170 parts of dimethylsulfoxide, operating under a nitrogen stream with stirring. A solution of 30.2 parts of ethyl formate in 20 parts of dimethylsulfoxide is added over a period of about 20 minutes, while cooling to 20°

C. The reaction mass is diluted with 1800 parts of water one hour after the end of the addition, and the pH is adjusted to 5 with 2 N sulfuric acid. The mixture is then subjected to a centrifugation, washed neutral, and dried; 57.3 parts of 2-formyl-5α-androstan 17β-ol-3-one, M.P. 140–144° C., are obtained; $[\alpha]_D = +61°$ (chloroform).

EXAMPLE 4

*2-formyl-5α-oestran-17β-ol-3-one*

9.12 parts of sodium hydride are added to a solution of 52.4 parts of 5α-ostran-17β-ol-3-one in 150 parts of dimethylsulfoxide, operating under a nitrogen stream with stirring. A solution of 30.2 parts of ethyl formate in 20 parts of dimethylsulfoxide is then added over a period of about 20 minutes, while cooling to 20° C. The reaction mass is diluted one hour after the end of the addition, the pH is adjusted to 4.5 with 2 N sulfuric acid, the mixture is filtered, and washed neutral. 53.6 parts of 2-formyl-5α-oestran-17β-ol-3-one, M.P. 190–192° C., are obtained upon drying; $[\alpha]_D = +131°$ (chloroform).

EXAMPLE 5

*2-formyl-5α-oestran-17β-ol-3-one*

To a solution of 11.4 parts of 5α-oestran-17β-ol-3-one in 40 parts of dimethylsulfoxide, 4.87 parts of sodium amide are added with stirring under a nitrogen stream. After 15 minutes, a solution of 9.94 parts of ethyl formate in 10 parts of dimethylsulfoxide is added dropwise over a period of 15 to 30 minutes, while keeping the temperature at about 20° C. The reaction mass is diluted with 500 parts of water one hour after the end of the addition, acidified to a pH of 5 with 2 N sulfuric acid, subjected to a centrifugation, and washed neutral. 12.08 parts of 2-formyl-5α-oestran-17β-ol-3-one, M.P. 189–191° C., are thus obtained; $[\alpha]_D = +131°$ (chloroform).

EXAMPLE 6

*2-formyl-17α-methyl-5α-oestran-17β-ol-3-one*

To a suspension of 28.6 parts of 17α-methyl-5α-oestran-17β-ol-3-one in 90 parts of dimethylsulfoxide, 10.8 parts of sodium methylate are added with stirring under a nitrostream and a solution of 15.9 parts of ethyl formate in 10 parts of dimethylsulfoxide is then added over a period of 10 to 30 minutes, while keeping the temperature at about 20° C. The reaction mass is diluted with 1200 parts of water one hour after the end of the addition, the pH is adjusted to 5 with 2 N sulfuric acid, and the mixture is subjected to a centrifugation, washed neutral and dried. 30.4 parts of 2-formyl-17α-methyl-5α-oestran-17β-ol-3-one, M.P. 204–206° C., are obtained; $[\alpha]_D = +95°$ (chloroform).

EXAMPLE 7

*2α-17α-dimethyl-5α-androstan-17β-ol-3-one*

To a solution of 7.5 parts of 2-formyl-17α-methyl-5α-androstan-17β-ol-3-one in 150 parts of absolute ethyl alcohol, 8.0 parts of a 1.25 N solution of hydrochloric acid suspended in ethanol are added. The mixture is hydrogenated in the presence of 7.50 parts of 5% palladium-on-carbon until the amount of hydrogen corresponding to 2 moles (1,1 parts) has been adsorbed, which requires 1 hour. The catalyst is then removed, and the mixture is neutralized with a sodium ethylate solution, and dried. The residue is dissolved into 30.0 parts of methylene chloride, washed with water, made anhydrous, and concentrated to a small volume. Upon crystallization from hexane-methylene chloride, 6.0 parts of 2α,17α-dimethyl-5α-androstan-17β-ol-3-one, M.P. 148–151° C., are obtained; $[\alpha]_D = +8°$ (ethanol).

EXAMPLE 8

*2α-methyl-5α-androstan-17β-ol-3-one*

Using the same procedure as in the previous example, but employing 12.4 parts of 2-formyl-5α-androstan-17β-ol-3-one as the starting material, 10.4 parts of 2α-methyl-5α-androstan-17β-ol-3-one, M.P. 150–152° C., are obtained; $[\alpha]_D = +32°$ (ethanol).

EXAMPLE 9

*2α-methyl-5α-oestran-17β-ol-3-one*

Using the same procedure as in the previous example, but employing 15 parts of 2-formyl-5α-oestran-17β-ol-3-one as the starting material, 11.5 parts of 2α-methyl-5α-oestran-17β-ol-3-one, M.P. 135–137° C., are obtained; $[\alpha]_D = +70°$ (chloroform).

EXAMPLE 10

*2α-17α-dimethyl-5α-oestran-17β-ol-3-one*

Using the same procedure as in the previous example, but employing 25 parts of 2-formyl-17α-methyl-5α-oestran-17β-ol-3-one as the starting material, 21.2 parts of 2α,17α-dimethyl-5α-oestran-17β-ol-3-one, M.P. 144–146° C., are obtained; $[\alpha]_D = +43°$ (chloroform).

EXAMPLE 11

*2α,17α-dimethyl-5α-androstan-17β-ol-3-on-azine*

To a solution of 5.2 parts of 2α,17α-dimethyl-5α-androstan-17β-ol-3-one in 20 parts of dioxane, 0.03 part of concentrated hydrochloric acid and 0.41 part of 98% hydrazine hydrate are added. After leaving overnight at room temperature, the precipitate which forms is filtered and, upon crystallization from methyl alcohol, yields 4.62 parts of 2α,17α-methyl-5α-androstan-17β-ol-3-on-azine, M.P. 258–260° C.; $[\alpha]_D = +112°$ (chloroform).

EXAMPLE 12

*2α-methyl-5α-androstan-17β-ol-3-on-azine-17-caproate*

To a solution of 13 parts of 2α-methyl-5α-androstan-17β-ol-3-one-17-caproate in 15 parts of ethyl alcohol, 0.074 part of concentrated hydrochloric acid and 1.05 parts of 98% hydrazine hydrate are added. A product is recovered by filtration after 8 hours at room temperature, which, upon crystallization from methyl alcohol, yields 12 parts of 2α-methyl-5α-androstan-17β-ol-3-on-azine-17-caproate, M.P. 208–212° C.; 240–242° C.; $[\alpha]_D = +114°$ (chloroform).

EXAMPLE 13

*2α,17α-dimethyl-5α-androstan-17β-ol-3-on-azine*

To a solution of 5.17 parts of 17α-methyl-5α-androstan-17β-ol-3-one in 57 parts of freshly distilled, anhydrous dioxane, 1.83 parts of sodium methylate and 2.84 parts of ethyl formate are successively added over a short period of time (10 to 15 minutes); the operation is carried out with stirring, under a nitrogen stream, while keeping the temperature at about 20–23° C. The mixture is stirred for 5 hours, and then 12.2 parts of a 4 N gaseous HCl solution in dioxane are added with external cooling. The mixture is then hydrogenated in the presence of 5.2 parts of 5% palladium-on-carbon until a quantity of hydrogen corresponding to 2 moles has been absorbed, which requires 1 hour. The catalyst is then removed, the solution is neutralized with sodium ethylate, concentrated to 20 parts of solvent, and 0.03 part of concentrated hydrochloric acid and 0.41 part of 98% hydrazine hydrate are added. After standing overnight at room temperature, the precipiate which is formed is filtered, and upon crystallization from methyl alcohol yields 3.62 parts of 2α,17α-dimethyl-5α-androstan-17β-ol-3-on-azine, M.P. 258–260° C.; $[\alpha]_D = +112°$ (chloroform).

EXAMPLE 14

*2α,17α-dimethyl-5α-androstan-17β-ol-3-on-azine*

To a solution of 15.51 parts of 17α-methyl-androstanolone in 150 parts of anhydrous tetrahydrofuran, 5.49 parts of sodium methylate and 8.52 parts of ethyl formate are successively added over a short period of time, operating under a nitrogen stream, with stirring, and keeping the temperature at about 26° C. 32 parts of a 4 N hydrogen chloride solution in tetrahydrofuran are added with external cooling after 30 minutes. The mixture is then hydrogenated in the presence of 16 parts of 5% palladium-on-carbon until an amount of hydrogen corresponding to 2 moles has been absorbed, which requires 1 hour. The catalyst is then removed, and the solution is neutralized, concentrated to 35 parts of tetrahydrofuran, and 0.09 part of concentrated hydrochloric acid and 1.23 parts of 98% hydrazine hydrate are added. After standing 14 hours at room temperature, the precipitate is filtered, and upon crystallization from methyl alcohol it yields 10.92 parts of 2α,17α - dimethyl - 5α-androstan - 17β - ol - 3 - on - azine, M.P. 258–260° C.; [α]$_D$=+112° (chloroform).

EXAMPLE 15

*2α-methyl-5α-androstan-17β-ol-3-on-azine*

Using the same procedure as in the previous example, but employing 29 parts of 5α-androstan-17β-ol-3-one as the starting material, 20.85 parts of 2α - methyl - 5α-androstan-17β-ol-3-on-azine, M.P. 238–239° C., are obtained [α]$_D$=+129° (chloroform).

EXAMPLE 16

*2α-methyl-5α-oestran-17β-ol-3-on-azine*

Using the same procedure as in the previous example, but employing 27.6 parts of 5α-oestran-17β-ol-3-one as the starting material, 17.8 parts of 2a-methyl-5α-oestran-17β-ol-3-on-azine, M.P.234–236° C., are obtained [α]$_D$=+112 (chloroform).

EXAMPLE 17

*2α-methyl-5α-androstan-17β-ol-3-on-azine-17-caproate*

To a solution of 14.5 parts of 5α-androstan-17β-ol-3-one in 100 parts of anhydrous tetrahydrofuran, 5.4 parts of sodium methylate and 8.4 parts of ethyl formate are successively added over a short period of time, operating under a nitrogen stream, with stirring, and keeping the temperature at about 15° C. 36.5 parts of a hydrogen chloride solution in tetrahydrofuran (4.3 N) are added with external cooling after 30 minutes, and the mixture is hydrogenated in the presence of 14.5 parts of 5% palladium-on-carbon. The catalyst is then removed, and the solution is neutralized and evaporated in a vacuum. The residue is treated with 87.0 parts of pyridine and 43.5 parts of caproic anhydride. After 14 hours at room temperature, the reaction mass is steam distilled, the residue is extracted with ether, washed with 3 N hydrochloric acid, water, 1 N sodium hydroxide, and then with water to neutrality. The organic layer is evaporated, the crystalline product (17.7 parts) is dissolved in 15 parts of ethyl alcohol, and 1.05 parts of 98% hydrazine hydrate and 0.074 part of concentrated hydrochloric acid are added. After 8 hours the separated product is filtered, and upon crystallization from methyl alcohol gives 13.25 parts of 2α - methyl - 5α - androstan-17β-ol-3-on-azine - 17 - caproate, M.P. 208–212° C.; 240–242° C.; [α]$_D$=+114° (chloroform).

EXAMPLE 18

*2α-methyl-5α-androstan-17β-ol-3-on-azine-17-acetate*

Using the same procedure as in the previous example, but treating the residue from the hydrogenation with pyridine and acetic anhydride, and by subsequent reaction with hydrazine hydrate and concentrated hydrochloric acid, as hereinbefore described, 10.27 parts of 2α - methyl - 5α - androstan - 17β - ol - 3 - on - azine-17-acetate, M.P. 267–269° C., are obtained; [α]$_D$=+95° (chloroform).

EXAMPLE 19

*2α-methyl-5α-androstan-17β-ol-3-on-17-enanthate*

Using the same procedure as in the previous example, and treating the residue from the hydrogenation with pyridine and enanthic anhydride, and by subsequent reaction with hydrazine hydrate and concentrated hydrochloric acid as hereinbefore described, 12.8 parts of 2α - methyl - 5α - androstan - 17β - ol-azine-17-enanthate, M.P. 206–208° C., are obtained; [α]$_D$=+112° (chloroform).

EXAMPLE 20

*2α-methyl-5α-androstan-17β-ol-3-on-azine-17-decanoate*

Using the same procedure as in the previous example, and treating the vacuum-dried residue form the hydrogenation with pyridine and decanoic acid chloride, and by subsequent reaction with hydrazine hydrate and concentrated hydrochloric acid as hereinbefore described, 12.16 parts of 2α - methyl - 5α - androstan - 17β - ol-3-on-azine-17-decanoate, M.P. 194–196° C. are obtained; [α]$_D$=104° (chloroform).

EXAMPLE 21

*2α-methyl-5α-oestran-17β-ol-3-on-azine-17-propionate*

To a solution of 5.7 parts of 5α-oestran-17β-ol-3-one in 57 parts of freshly distilled, anhydrous dioxane, 1.32 parts of sodium amide and 2.84 parts of ethyl formate are successively added over a short period of time (10–15 minutes), operating under a nitrogen stream, with stirring, and keeping the temperature at about 20–23° C. The mixture is stirred for 5 hours, and 14 parts of a 4 N gaseous hydrogen chloride solution in dioxane are then added. The mixture is then hydrogenated in the presence of 5.7 parts of 5% palladium-on-carbon until a quantity of hydrogen corresponding to 2 moles has been absorbed, which requires 1 hour. The catalyst is then removed, and the solution is neutralized and evaporated to dryness. The residue is treated with 18 parts of pyridine and 9 parts of propionic anhydride. After 18 hours at room temperature, the mixture is steam distilled, extracted with ether, and from the organic layer, after the usual washing steps with 2 N hydrochloric acid, water, 2 N sodium hydroxide, and water, a crude product is obtained upon solvent evaporation, which is dissolved in 25 parts of ethyl alcohol and 0.41 part of 98% hydrazine hydrate and 0.03 part of concentrated hydrochloric acid are added. After 8 hours the product which forms is filtered and, upon crystallization from methyl alcohol, it yields 4.21 parts of 2α-methyl-5α-oestran-17β-ol-3-on-azine-17-propionate, M.P. 241–243° C.; [α]$_D$=+100° (chloroform).

EXAMPLE 22

*2α-methyl-5α-oestran-17β-ol-3-on-azine-17-enanthate*

Using the same procedure as in the previous example, but employing 5.7 parts of 5α-oestran-17β-ol-3-one as the starting material, and treating the residue from the hydrogenation with pyridine and enanthic anhydride, and by subsequent reaction with hydrazine hydrate and concentrated hydrochloric acid as hereinbefore described, 4.43 parts of 2α - methyl - 5α - oestran - 17β - ol - 3 - on - azine-17-enanthate, M.P. 247–250° C., are obtained; [α]$_D$=+102° (chloroform).

What I claim is:
1. The process in which a compound of the formula:

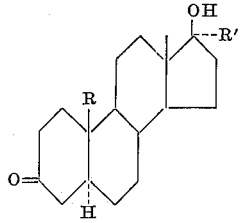

wherein R and R' are members selected from the group consisting of hydrogen and methyl, is reacted with ethyl formate in the presence of a condensing agent selected from the group consisting of sodium methylate, sodium hydride, and sodium amide, in a solvent selected from the group consisting of tetrahydrofuran, dioxane, dimethylsulfoxide, dimethylformamide, and dimethylacetamide to form the 2-hydroxymethylene derivative of said compound.

2. The process of claim 1 in which said solvent is selected from the group consisting of tetrahydrofuran and dioxane and while in said solvent, said 2-hydroxymethylene derivative is subjected to a reduction by hydrogen at atmospheric pressure in the presence of palladium-on-carbon as a catalyst and of a solution of gaseous hydrogen chloride in said solvent to form the 2a-methyl derivative of said compound.

3. The process of claim 2, in which after neutralization and removal of the catalyst, said 2a-methyl derivative is treated with hydrazine hydrate and with catalytic amounts of concentrated hydrochloric acid to obtain a compound of the formula:

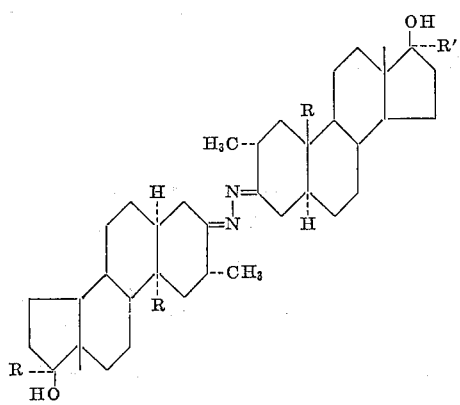

wherein R and R' are members selected from the group consisting of hydrogen and methyl.

4. The process of claim 2, in which after neutralization and removal of the catalyst, said 2a-methyl derivative is reacted with a member selected from the group consisting of chlorides and anhydrides of aliphatic acids of 2 to 10 carbon atoms, and the 17β-ester which is thus obtained is treated with hydrazine hydrate and a catalytic amount of concentrated hydrochloric acid to obtain a compound of the formula:

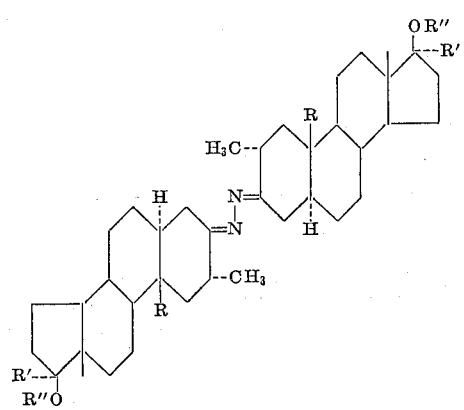

wherein R and R' are members selected from the group consisting of hydrogen and methyl, and R'' is a radical of an aliphatic acid of 2 to 10 carbon atoms.

5. A process for preparing a compound of the formula

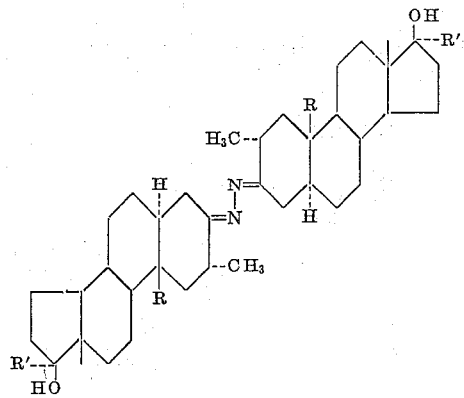

wherein R and R' are each a member selected from the group consisting of hydrogen and methyl, comprising reacting a 3-keto steroid of the formula

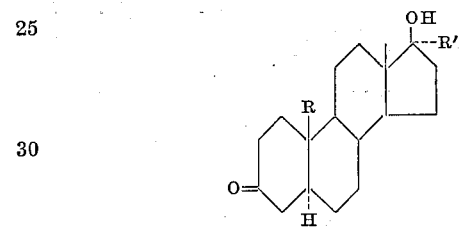

wherein R and R' have the same meaning as above with ethyl formate in the presence of a condensing agent selected from the group consisting of sodium methylate, sodium hydride and sodium amide in a solvent selected from the group consisting of tetrahydrofuran and dioxane to form the 2-hydroxymethylene derivative of said 3-keto steroid, hydrogenating said 2-hydroxymethylene derivative at atmospheric pressure in the presence of a palladium-on-carbon catalyst and a solution of gaseous hydrogen chloride in said solvent until 2 moles of hydrogen have been absorbed to form the 2α-methyl derivative of said 3-keto steroid, removing said catalyst from the reaction medium, concentrating the reaction medium by removing a portion of said solvent therefrom, reacting said 2α-methyl derivative with hydrazine hydrate in the presence of a catalytic amount of concentrated hydrochloric acid and recovering the desired compound from the reaction medium, the entire process being carried out in situ in the same reaction medium and vessel.

6. A process for preparing a compound of the formula

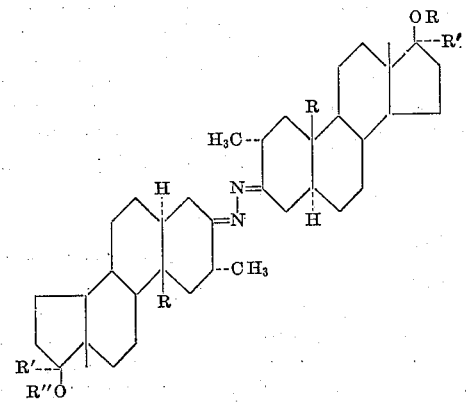

wherein R and R' are each a member selected from the group consisting of hydrogen and methyl and R'' is a radical of an aliphatic acid of 2 to 10 carbon atoms, comprising reacting a 3-keto steroid of the formula

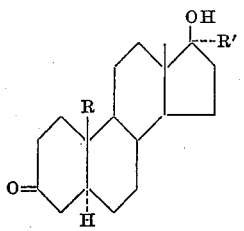

wherein R and R' have the same meaning as above with ethyl formate in the presence of a condensing agent selected from the group consisting of sodium methylate, sodium hydride and sodium amide in a solvent selected from the group consisting of tetrahydrofuran and dioxane to form the 2-hydroxymethylene derivative of said 3-keto steroid, hydrogenating said 2-hydroxymethylene derivative at atmospheric pressure in the presence of a palladium-on-carbon catalyst and a solution of gaseous hydrogen chloride in said solvent until 2 moles of hydrogen have been absorbed to form the 2α-methyl derivative of said 3-keto steroid, the formation of said 2-hydroxymethylene and 2α-methyl derivatives being carried out in situ in the same reaction medium and vessel, removing the catalyst from the reaction medium, evaporating the solvent, reacting the residue containing said 2α-methyl derivative in the presence of pyridine with a member selected from the group consisting of an anhydride and chloride of an aliphatic acid of 2 to 10 carbon atoms to form the corresponding 17β-ester, recovering said 17β-ester from the reaction mixture, and reacting said ester with hydrazine hydrate in the presence of a catalytic amount of concentrated hydrochloric acid to obtain the desired compound.

7. A process for preparing a compound of the formula

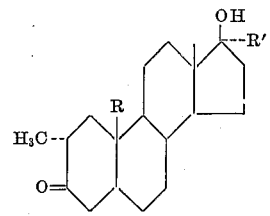

wherein R and R' are each a member selected from the group consisting of hydrogen and methyl, comprising hydrogenating the corresponding 2-hydroxymethylene derivative in an organic solvent at atmospheric pressure in the presence of palladium-on-carbon as a catalyst and a solution of gaseous hydrogen chloride in said solvent until 2 moles of hydrogen have been absorbed for each mole of the starting compound.

References Cited by the Examiner
UNITED STATES PATENTS 3,062,847 11/1962 Ruggieri _____ 260—397.5

OTHER REFERENCES

Ringold et al., Journal of American Chem. Soc. (1959), pages 427–432 relied on.

LEWIS GOTTS, Primary Examiner.

ELBERT L. ROBERTS, Examiner.